United States Patent
Kishiyama et al.

(10) Patent No.: US 9,137,789 B2
(45) Date of Patent: Sep. 15, 2015

(54) MOBILE TERMINAL APPARATUS AND METHOD OF TRANSMITTING AN UPLINK CONTROL INFORMATION SIGNAL

(71) Applicant: NTT DOCOMO, INC., Tokyo (JP)

(72) Inventors: Yoshihisa Kishiyama, Tokyo (JP); Teruo Kawamura, Tokyo (JP); Daisuke Nishikawa, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 14/636,597

(22) Filed: Mar. 3, 2015

(65) Prior Publication Data

US 2015/0181591 A1 Jun. 25, 2015

Related U.S. Application Data

(63) Continuation of application No. 13/578,910, filed as application No. PCT/JP2011/053081 on Feb. 15, 2011, now Pat. No. 9,008,019.

(30) Foreign Application Priority Data

Feb. 15, 2010 (JP) ................... 2010-030374
Aug. 16, 2010 (JP) ................... 2010-181684

(51) Int. Cl.
*H04W 52/32* (2009.01)
*H04W 72/04* (2009.01)
*H04W 52/34* (2009.01)

(52) U.S. Cl.
CPC .......... *H04W 72/0413* (2013.01); *H04W 52/34* (2013.01)

(58) Field of Classification Search
USPC ............ 370/311, 230, 277, 437; 455/522, 68, 455/69
See application file for complete search history.

(56) References Cited

U.S. PATENT DOCUMENTS

| | | | |
|---|---|---|---|
| 8,675,528 B2 | 3/2014 | Khoshnevis et al. | |
| 8,982,801 B2 * | 3/2015 | Shin et al. | 370/329 |
| 2010/0098012 A1 | 4/2010 | Bala et al. | |
| 2010/0195575 A1 | 8/2010 | Papasakellariou et al. | |
| 2011/0021203 A1 | 1/2011 | Yamada et al. | |

(Continued)

FOREIGN PATENT DOCUMENTS

JP 2006-237897 A 9/2006

OTHER PUBLICATIONS

3GPP TSG RAN WG #59bis, Samsung, Jan. 19-23, 2010, R1-100100, pp. 1-4.*

(Continued)

*Primary Examiner* — Phuongchau Ba Nguyen
(74) *Attorney, Agent, or Firm* — Osha Liang LLP

(57) ABSTRACT

To suppress and minimize changes from the method of transmitting an uplink control information in the LTE system, while supporting increases in the system band and increases in the transmission layer when there is a PUSCH signal transmitted in the same subframe, provided is a configuration for generating a UCI signal for a base station apparatus (20) in a mobile communication system having a system band comprised of a plurality of component carriers, multiplexing the UCI signal into a PUSCH signal transmitted in the same subframe as the UCI signal in a user specific component carrier used in transmission of a PUCCH signal, and transmitting the PUSCH signal into which the UCI signal is multiplexed to the base station apparatus (20).

3 Claims, 16 Drawing Sheets

(56) References Cited

U.S. PATENT DOCUMENTS

| | | | |
|---|---|---|---|
| 2011/0141928 A1 | 6/2011 | Shin et al. | |
| 2011/0280169 A1* | 11/2011 | Seo et al. | 370/311 |
| 2011/0286436 A1 | 11/2011 | Suzuki et al. | |
| 2011/0287804 A1* | 11/2011 | Seo et al. | 455/522 |
| 2012/0224552 A1* | 9/2012 | Feuersanger et al. | 370/329 |
| 2013/0028209 A1* | 1/2013 | Kishiyama et al. | 370/329 |
| 2013/0034056 A1 | 2/2013 | Kishiyama et al. | |

OTHER PUBLICATIONS

3GPP TSG RAN WG #59b, LG Electronics, Jan. 18-22, 2010, R1-100218.*

International Search Report w/translation from PCT/JP2011/053081 mailed May 24, 2011.

3GPP TR25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

3GPP TSG RAN WG1#59B, R1-100218; "UCI piggyback onto PUSCH in LTE-Advanced"; LG Electronics, Valencia, Spain; Jan. 18-22, 2010 (5 pages).

Notification of Reasons for Rejection for Japanese Application No. 2010-181684 dated Oct. 2, 2012, with English translation thereof (6 pages).

3GPP TSG RAN WG1 #59bis, R1-100100, "UL TPC in Rel.10," Samsung;Valencia, Spain, Jan. 19-23, 2010 (4 pages).

3GPP TSG RAN WG1 #59bis, R1-100131, "Discussion on Data and Control Multiplexing in UL MIMO Transmissions," Samsung; Valencia, Spain, Jan. 18-22, 2010 (4 pages).

Qualcomm Incorporate, "UL Power Control for Multicarrier Operation", 3GPP TSG RAN WG1 #59bis; R1-100677; Valencia, Spain, Jan. 18, 2010 through Jan. 22, 2010; (5 pages).

Office Action in corresponding Japanese Patent Application No. 2013-040590 mailed Nov. 11, 2014, with translation (6 pages).

\* cited by examiner

MOBILE TERMINAL APPARATUS AND METHOD OF TRANSMITTING AN UPLINK CONTROL INFORMATION SIGNAL

CROSS-REFERENCE TO RELATED APPLICATIONS

The present application is a continuation application of and, thereby, claims benefit under 35 U.S.C. §120 to U.S. patent application Ser. No. 13/578,910 filed on Aug. 14, 2012, titled, "MOBILE TERMINAL APPARATUS AND METHOD OF TRANSMITTING AN UPLINK CONTROL INFORMATION SIGNAL," which is a national stage application of PCT Application No. PCT/JP2011/053081, filed on Feb. 15, 2011, which claims priority to Japanese Patent Application Nos. 2010-030374 and 2010-181684 filed on Feb. 15, 2010 and Aug. 16, 2010, respectively. The contents of the priority applications are incorporated by reference in their entirety.

TECHNICAL FIELD

The present invention relates to a mobile terminal apparatus and method of transmitting an uplink control information signal in the next-generation mobile communication system.

BACKGROUND

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied (Non-patent Document 1). In LTE, as a multiplexing scheme, OFDMA (Orthogonal Frequency Division Multiple Access) different from W-CDMA is used in downlink, while SC-FDMA (Single Carrier Frequency Division Multiple Access) is used in uplink.

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). Accordingly, it is expected that such a plurality of mobile communication systems coexists in the future, and it is conceivable that configurations (base station apparatus, mobile terminal apparatus and the like) that support the plurality of systems are needed.

Non-Patent Literature

[Non-patent Literature 1] 3GPP, TR25.912 (V7.1.0), "Feasibility Study for Evolved UTRA and UTRAN", September 2006

SUMMARY OF INVENTION

The present invention was made in view of such a respect, and it is an object of the invention to provide a mobile terminal apparatus and method of transmitting an uplink control information signal that support each of mobile communication systems when a plurality of mobile communication systems coexists.

A mobile terminal apparatus of the invention is characterized by having an uplink control information signal generating section that generates an uplink control information signal for a base station apparatus in a mobile communication system having a system band comprised of a plurality of base frequency blocks, a multiplexing section that multiplexes the uplink control information signal into an uplink shared data channel signal transmitted in the same subframe as the uplink control information signal in a particular base frequency block used in transmission of an uplink control channel signal, and a transmission section that transmits the uplink shared data channel signal into which the uplink control information signal is multiplexed to the base station apparatus.

According to the invention, in a mobile communication system having a system band comprised of a plurality of base frequency blocks, an uplink control information signal is multiplexed into an uplink shared data channel signal transmitted in the same subframe in a particular base frequency block. Accordingly, in carrier aggregation for aggregating a plurality of base frequency blocks to widen the band, it is possible to cause a plurality of mobile communication systems to coexist while suppressing to minimize changes from a method of transmitting an uplink control information signal of a mobile communication system of a single base frequency block.

DESCRIPTION OF EMBODIMENTS

Figure 1:
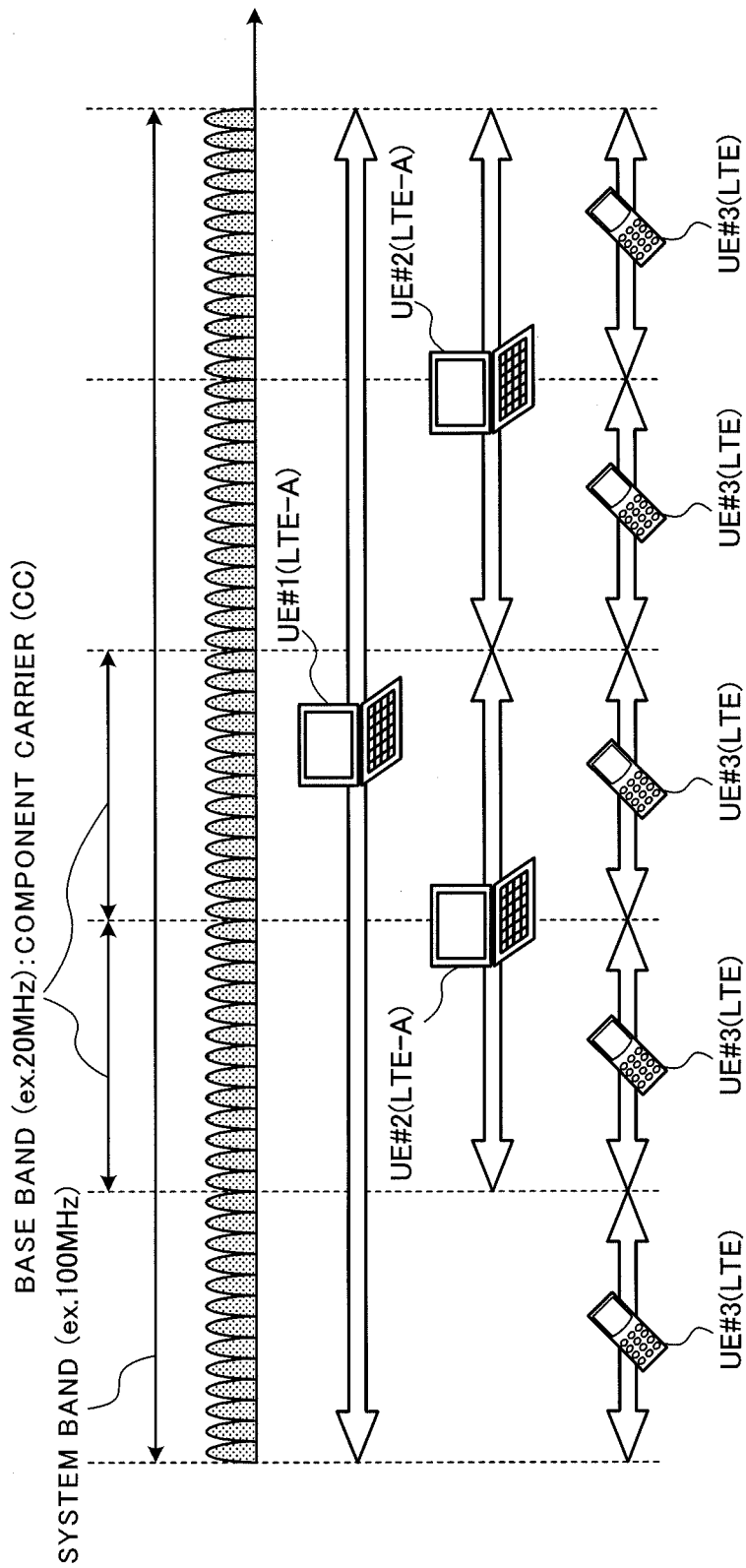
FIG. 1 is an explanatory view of a system band of an LTE system.

FIG. 1 is a diagram to explain a frequency usage state when mobile communications are performed in downlink. In addition, in the following descriptions, a base frequency block is described as a component carrier. The example as shown in FIG. 1 is of the frequency usage state in the case of coexistence of LTE-A systems that are first mobile communication systems having first relatively wide system bands comprised of a plurality of component carriers, and LTE systems that are second mobile communication systems having a second relatively narrow system band (herein, comprised of a single component carrier). In the LTE-A systems, for example, radio communications are performed with a variable system bandwidth of 100 MHz or less, and in the LTE systems, radio communications are performed with a variable system bandwidth of 20 MHz or less. The system band of the LTE-A system is at least one base frequency region (component carrier: CC) with a system band of the LTE system as a unit. Thus aggregating a plurality of base frequency regions to broaden the band is referred to as carrier aggregation.

For example, in FIG. 1, the system band of the LTE-A system is a system band (20 MHz×5=100 MHz) containing bands of five component carriers where the system band (base band: 20 MHz) of the LTE system is one component carrier. In FIG. 1, a mobile terminal apparatus UE (User Equipment) #1 is a mobile terminal apparatus supporting the LTE-A system (also supporting the LTE system), and has the system band of 100 MHz, UE#2 is a mobile terminal apparatus supporting the LTE-A system (also supporting the LTE system), and has the system band of 40 MHz (20 MHz×2=40 MHz), and UE#3 is a mobile terminal apparatus supporting the LTE system (not supporting the LTE-A system), and has the system band of 20 MHz (base band).

Figure 2A:
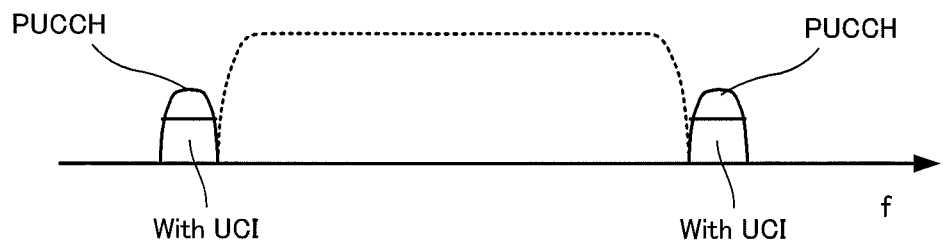
FIGS. 2A and 2B contain explanatory views of a method of transmitting a UCI signal in an LTE system (Release-8)
Figure 2B:
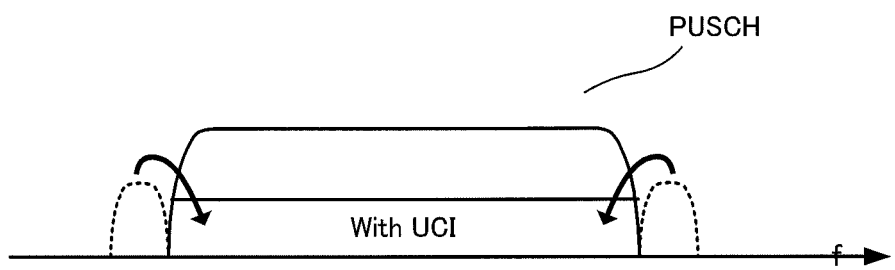

In addition, in the LTE system (Release-8), a mobile terminal apparatus UE transmits a UCI (Uplink Control Information) signal to a base station apparatus eNB. The UCI signal is comprised of one or combination of any of CQI (Channel Quality Indicator), PMI (Precoding Matrix Indicator), RI (Rank Indicator), ACK (Acknowledgement), NACK (NegativeAcknowledgement) etc. In this case, as shown in FIG. 2A, when there is no PUSCH (Physical Uplink Shared Channel) signal transmitted in the same subframe, a UCI signal is included in a PUCCH (Physical Uplink Control Channel) signal and transmitted. Meanwhile, as shown in FIG. 2B, when there is a PUSCH signal transmitted in the same subframe, a UCI signal is included in the PUSCH signal and transmitted.

Figure 3A:
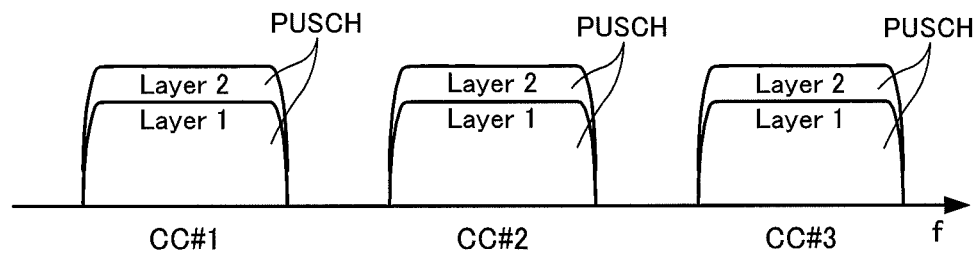
FIGS. 3A and 3B contain explanatory views of a method of transmitting a UCI signal in non-transmission of PUSCH in an LTE-A system.
Figure 3B:
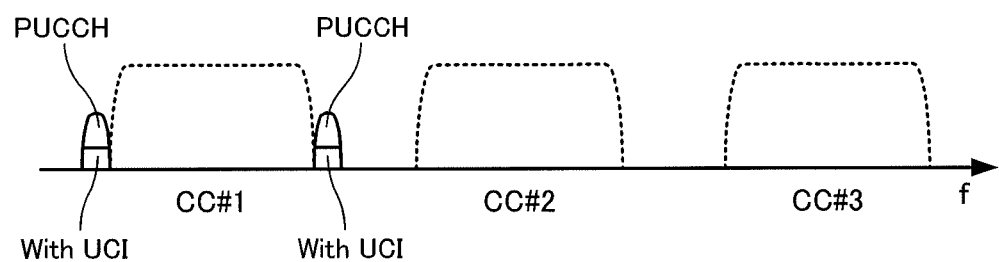

Further, the method of transmitting a UCI signal is also studied in the LTE-A system. As shown in FIG. 3A, in the LTE-A system, in addition to the fact that the system band is configured using a plurality of component carriers with the system band of the LTE system as a unit, MIMO multiplexing transmission is supported, and it is not possible to use the method of transmitting a UCI signal in the LTE system without modification. In this case, as shown in FIG. 3B, when there is no PUSCH signal transmitted in the same subframe, it is conceivable to include the UCI signal in a PUCCH signal of a user specific (UE-specific) component carrier. However, the still remaining issue is a method of transmitting a UCI signal when there is a PUSCH signal transmitted in the same subframe.

Therefore, to solve the problem, the inventors of the invention arrived at the invention. In other words, it is the gist of the invention to suppress and minimize changes from the method of transmitting a UCI signal in the LTE system, while supporting increases in the system band and increases in the transmission layer when there is a PUSCH signal transmitted in the same subframe as the UCI signal.

An Embodiment of the invention will specifically be described below with reference to accompanying drawings. Described herein is a configuration for applying the invention to an LTE-A system, but the invention is not limited this configuration. The invention is applicable to any mobile communication systems as long as the systems are mobile terminal systems for transmitting uplink control information signals in uplink, in carrier aggregation for aggregating a plurality of base frequency blocks to widen the band. Herein, an uplink control channel mainly used in control of uplink is referred to as a PUCCH, and an uplink shared data channel mainly used in transmission of user data is referred to as a PUSCH, but the channels are not limited these names.

Figure 4:
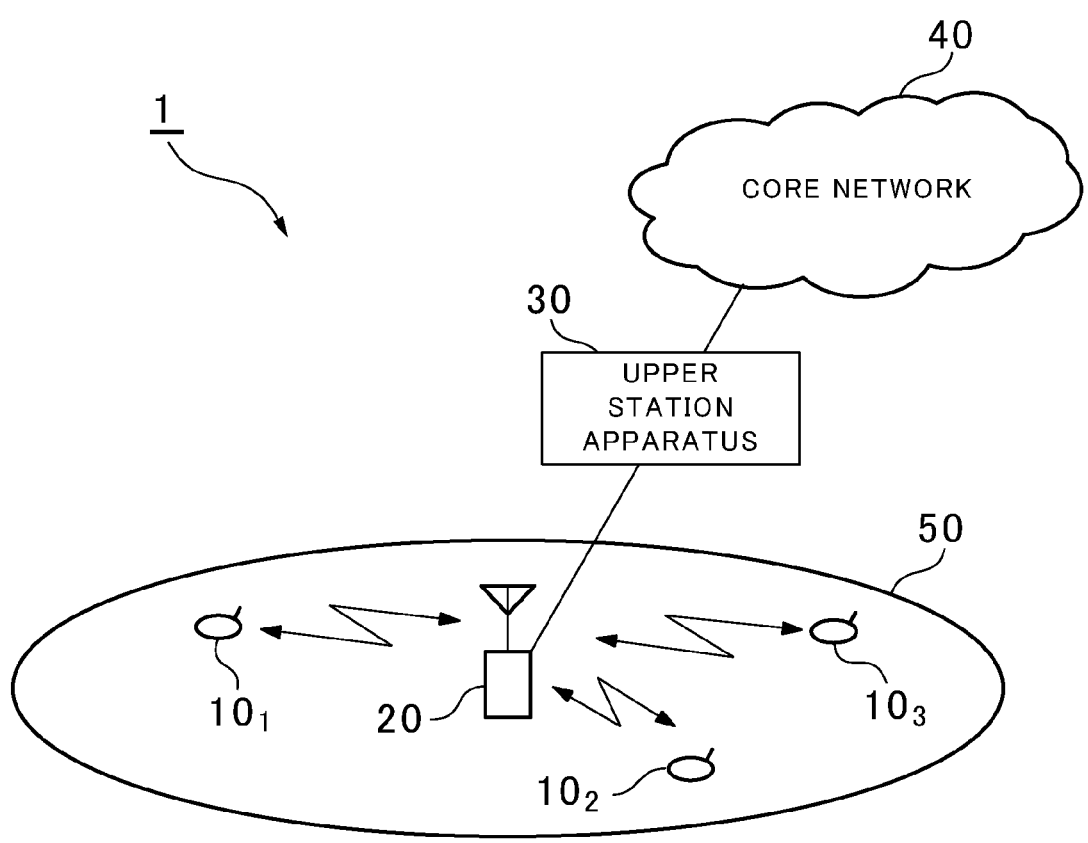
FIG. 4 is an explanatory view of a configuration of a mobile communication system.

Referring to FIG. 4, described is a mobile communication system 1 having mobile terminal apparatuses (UEs) 10 and base station apparatus (Node B) 20 according to the Embodiment of the invention. FIG. 4 is a diagram to explain a configuration of the mobile communication system 1 having the mobile terminal apparatuses 10 and base station apparatus 20 according to this Embodiment. In addition, as described above, the mobile communication system 1 as shown in FIG. 4 is a system including the LTE-A system. LTE-A may be called IMT-Advanced or may be called 4G.

As shown in FIG. 4, the mobile communication system 1 includes the base station apparatus 20 and a plurality of mobile terminal apparatuses 10 ($10_1$, $10_2$, $10_3$, ..., $10_n$, n is an integer where n>0) that communicate with the base station apparatus 20 and is comprised thereof. The base station apparatus 20 is connected to an upper station apparatus 30, and the upper station apparatus 30 is connected to a core network 40. The mobile terminal apparatus 10 communicates with the base station apparatus 20 in a cell 50. In addition, for example, the upper station apparatus 30 includes an access gateway apparatus, radio network controller (RNC), mobility management entity (MME), etc., but is not limited thereto.

Each of the mobile terminal apparatuses 10 ($10_1$, $10_2$, $10_3$, ..., $10_n$) includes an LTE terminal and LTE-A terminal, and is described as a mobile terminal apparatus 10 unless otherwise specified in the following description. Further, for convenience in description, the description is given while assuming that equipment that performs radio communication with the base station apparatus 20 is the mobile terminal apparatus 10, and more generally, the equipment may be user equipment (UE) including mobile terminal apparatuses and fixed terminal apparatuses.

In the mobile communication system 1, as a radio access scheme, OFDMA (Orthogonal Frequency Division Multiple Access) is applied in downlink, while SC-FDMA (Single-Carrier Frequency Division Multiple Access) is applied in uplink. OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in the LTE system. In downlink, used are the PDSCH (Physical Downlink Shared Channel) shared among the mobile terminal apparatuses 10, the PDCCH (Physical Downlink Control Channel) that is a control channel in downlink, PCFICH (Physical Control Format Indicator Channel) and PHICH (Physical Hybrid-ARQ Indicator Channel). The PDSCH is used in transmission of PDSCH signals mainly including downlink user data, control information of a higher layer, etc. The PDCCH is used in transmission of PDCCH signals mainly including information of component carriers that the base station apparatus 20 assigns to mobile terminal apparatuses 10, scheduling information, etc.

In uplink, used are the PUSCH shared among the mobile terminal apparatuses 10, and the PUCCH that is a control channel in uplink. The PUSCH is used in transmission of PUSCH signals (uplink shared data channel signals) mainly including uplink user data, control information of the higher layer, etc. The PUCCH is used in transmission of PUCCH signals (uplink control channel signals) mainly including scheduling information, downlink CQI, ACK/NACK, etc. In addition, the PUCCH is assigned radio resources at opposite ends of each component carrier.

Figure 5:
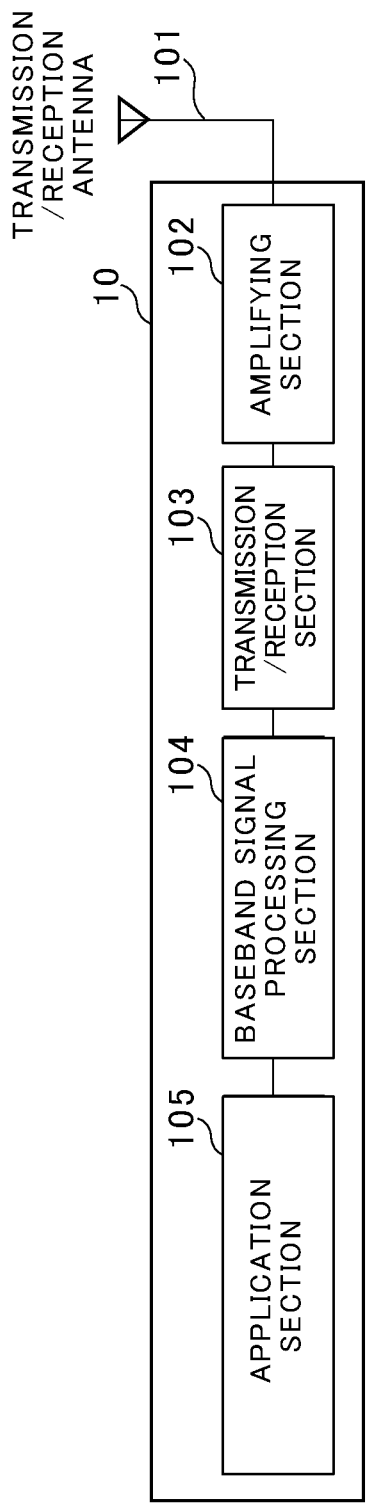
FIG. 5 is an explanatory view of the entire configuration of a mobile terminal apparatus.

Referring to FIG. 5, described next is the entire configuration of the mobile terminal apparatus according to this Embodiment. FIG. 5 is the entire configuration diagram of the mobile terminal apparatus according to this Embodiment. The mobile terminal apparatus 10 is provided with a transmission/reception antenna 101, amplifying section 102, transmission/reception section 103, baseband signal processing section 104 and application section 105.

With respect to data in downlink, a radio frequency signal received in the transmission/reception antenna 101 is amplified in the amplifying section 102, subjected to frequency conversion in the transmission/reception section 103, and is converted into a baseband signal. The baseband signal is subjected to Fast Fourier Transform (FFT) processing, error correcting decoding, reception processing of retransmission control, etc. in the baseband signal processing section 104. Among the data in downlink, user data in downlink is transferred to the application section 105. The application section 105 performs processing concerning layers higher than the physical layer and MAC layer and the like. Further, among the data in downlink, broadcast information is also transferred to the application section 105.

Meanwhile, the application section 105 inputs user data in uplink to the baseband signal processing section 104. The baseband signal processing section 104 performs transmission processing of retransmission control (H-ARQ (Hybrid ARQ)), channel coding, Discrete Fourier Transform (DFT) processing, Inverse Fast Fourier Transform (IFFT) processing, etc. on the data to transfer to the transmission/reception section 103. The transmission/reception section 103 performs frequency conversion processing for converting the baseband signal output from the baseband signal processing section 104 into a signal with a radio frequency band, and then, the signal is amplified in the amplifying section 102, and is transmitted from the transmission/reception antenna 101.

Figure 6:
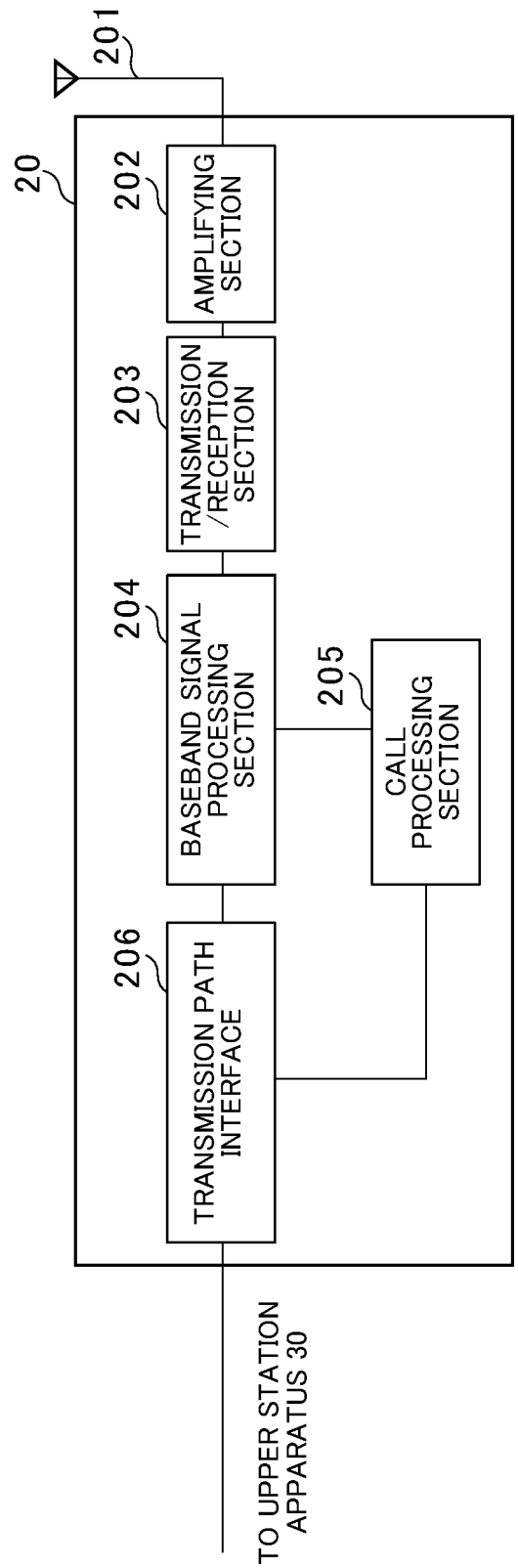
FIG. 6 is an explanatory view of the entire configuration of a base station apparatus.

Referring to FIG. 6, described next is the entire configuration of the base station apparatus according to this Embodiment. FIG. 6 is the entire configuration diagram of the base station apparatus according to this Embodiment. The base station apparatus 20 is provided with a transmission/reception antenna 201, amplifying section 202, transmission/reception section 203, baseband signal processing section 204, call processing section 205 and transmission path interface 206.

The user data in downlink is input to the baseband signal processing section 204 via the transmission path interface 206 from the upper station apparatus 30 positioned higher than the base station apparatus 20. The baseband signal processing section 204 performs PDCP layer processing, segmentation and concatenation of the user data, RLC (Radio Link Control) layer transmission processing such as transmission processing of RLC retransmission control, MAC (MediumAccess Control) retransmission control e.g. transmission processing of HARQ (Hybrid Automatic Repeat reQuest), scheduling, transmission format selection, channel coding, Inverse Fast Fourier Transform processing and pre-coding processing.

Further, with respect to the PDCCH signal that is a downlink control channel, the transmission processing such as channel coding and Inverse Fast Fourier Transform is also performed, and the resultant is transferred to the transmission/reception section 203. Furthermore, on a broadcast channel, the baseband signal processing section 204 notifies the mobile terminal apparatuses 10 connected in the same cell 50 of control information for each mobile terminal apparatus 10 to perform radio communication with the base station apparatus 20. The transmission/reception section 203 performs frequency conversion processing for converting the baseband signal output from the baseband signal processing section 204 into a signal with a radio frequency band, and then, the signal is amplified in the amplifying section 202 and transmitted from the transmission/reception antenna 201.

Meanwhile, with respect to data in uplink, a radio frequency signal received in the transmission/reception antenna 201 is amplified in the amplifying section 202, subjected to frequency conversion in the transmission/reception section 203, thereby converted into a baseband signal, and is input to the baseband signal processing section 204. The baseband signal processing section 204 performs Fast Fourier Transform processing, Inverse Discrete Fourier Transform (IDFT) processing, error correcting decoding, reception processing of MAC retransmission control, and reception processing of RLC layer and PDCP layer on the user data included in the input baseband signal, and transfers the resultant to the upper station apparatus 30 via the transmission path interface 206. The call processing section 205 performs call processing such as setting and release of the communication channel, status management of the base station apparatus 20, and management of radio resources.

Figure 7:
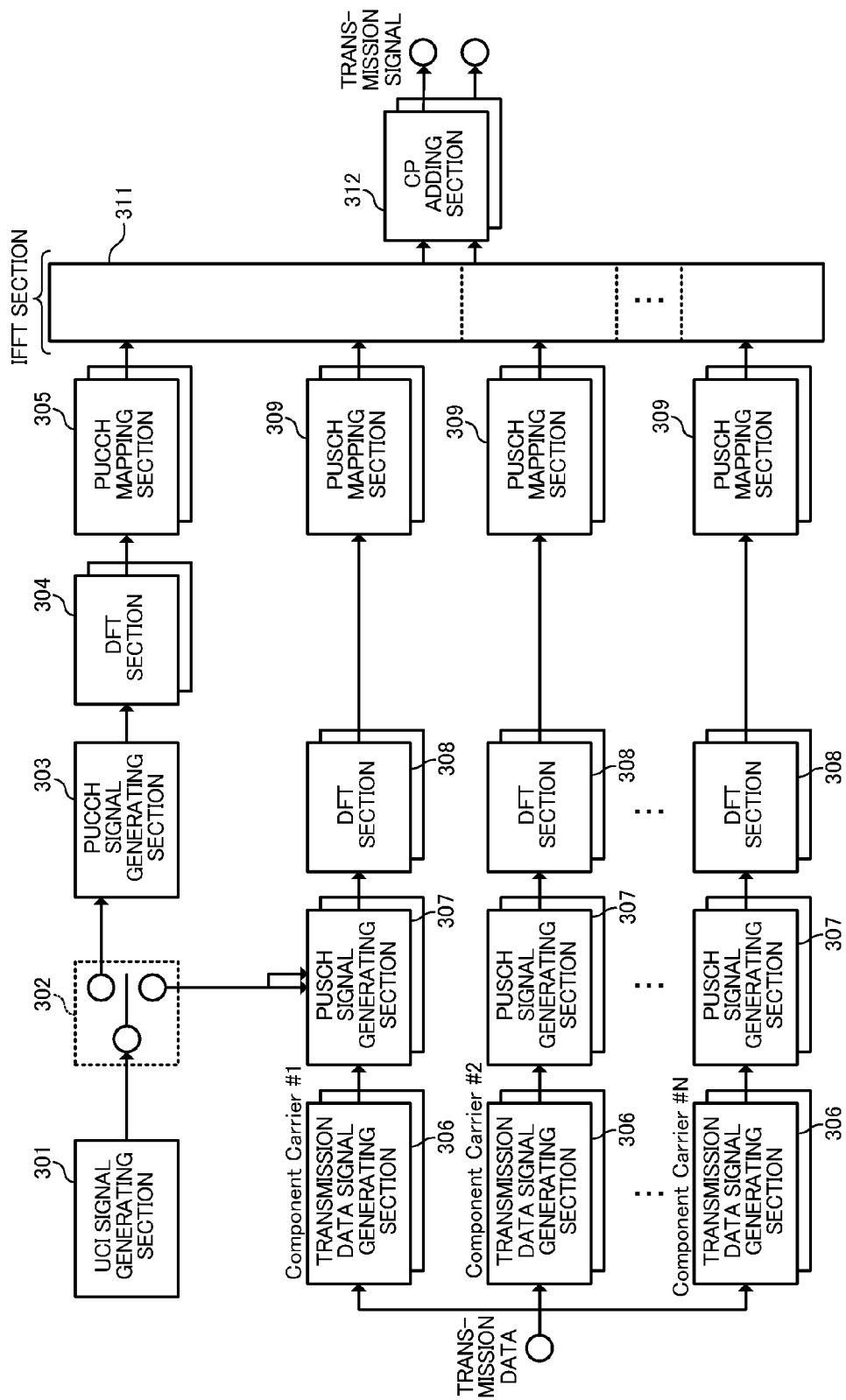
FIG. 7 is a functional block diagram of a baseband signal processing section that the mobile terminal apparatus has.

Referring to FIG. 7, described is the functional configuration of the baseband signal processing section that the mobile terminal apparatus has according to this Embodiment. FIG. 7 is a functional block diagram of the baseband signal processing section that the mobile terminal apparatus has according to this Embodiment. In addition, in FIG. 7, described is an uplink configuration for the mobile terminal apparatus to transmit transmission signals to the base station apparatus. Further, FIG. 7 exemplifies the mobile terminal configuration that supports a mobile communication system with N component carriers (CC#1 to CC#N), and describes the configuration for performing transmission using two transmission layers.

As shown in FIG. 7, the baseband signal processing section 104 is provided with a UCI signal generating section 301, path switching section 302, PUCCH signal generating section 303, DFT sections 304, and PUCCH mapping sections 305. The UCI signal generating section 301 generates a UCI signal to input to the path switching section 302. The UCI signal is comprised of one or combination of any of CQI, PMI, RI, ACK, NACK, etc.

The path switching section 302 switches a signal path of the UCI signal corresponding to the presence or absence of the PUSCH signal in a user specific (UE-specific) component carrier. The user specific component carrier indicates a component carrier that is assigned for each user and that is used in transmission of the PUCCH signal. In the following description, the description is given assuming that the user specific component carrier is a component carrier #1.

When the PUSCH signal is not transmitted in the same subframe as the UCI signal in the component carrier #1, the path switching section 301 switches an input destination of the UCI signal to the PUCCH signal generating section 303. Meanwhile, when the PUSCH signal is transmitted in the same subframe as the UCI signal in the component carrier #1, the path switching section 302 switches an input destination of the UCI signal to a PUSCH signal generating section 307 of the component carrier #1.

In addition, the path switching section 302 may switch the input destination of the UCI signal to the PUSCH signal generating section 307 of a single transmission layer of the component carrier #1 or PUSCH signal generating sections 307 of all transmission layers of the component carrier #1.

Further, the path switching section 302 may be configured to enable the section 302 to switch the input destination of the UCI signal between the PUSCH signal generating section 307 of a single transmission layer of the component carrier #1 and the PUSCH signal generating sections 307 of all transmission layers of the component carrier #1, when the PUSCH signal is transmitted in the same subframe as the UCI signal. In this case, the path switching section 302 is capable of switching the input destination corresponding to the signal type of the UCI signal. For example, for the UCI signal such as ACK, NACK and RI requiring the quality, the path switching section 302 switches the input destination to the PUSCH signal generating sections 307 of all transmission layers of the component carrier #1, and for remaining CQI and PMI, switches to the PUSCH signal generating section 307 of a first layer of the component carrier #1. In addition, the path switching section 302 is not limited to the configuration for switching corresponding to the signal type of the UCI signal as described above, and may be a switchable configuration corresponding to other predetermined conditions such as a change in the communication environment or the like.

The PUCCH signal generating section 303 generates a PUCCH signal, and provides the PUCCH signal with an error correcting code, while modulating the coded PUCCH signal for each of a plurality of subcarriers. Further, when the UCI signal is input from the path switching section 302, the PUCCH signal generating section 303 multiplexes the UCI signal into the PUCCH signal. The PUCCH signal generating section 303 inputs the modulated PUCCH signal to the DFT section 304. The DFT section 304 performs discrete Fourier transform on the coded/modulated PUCCH signal, thereby transforms the time-series signal into the signal in the frequency domain, and inputs the transformed PUCCH signal to the PUCCH mapping section 305. The PUCCH mapping section 305 maps the DFT-processed PUCCH signal to radio resources.

Further, the baseband signal processing section 104 is provided with transmission data signal generating sections 306, PUSCH signal generating sections 307, DFT sections 308, and PUSCH mapping sections 309 for each component carrier. The transmission data signal generating section 306 generates an uplink transmission data signal including user data and the like using data delivered from the higher layer for each transmission layer, and inputs the transmission data signal to the PUSCH signal generating section 307.

The PUSCH signal generating section 307 generates a PUSCH signal for each transmission layer based on the transmission data signal, and provides the PUSCH signal with an error correcting code, while modulating the coded PUSCH signal for each of a plurality of subcarriers. Further, when the UCI signal is input from the path switching section 302, the PUSCH signal generating section 307 multiplexes the transmission data signal and the UCI signal to generate a PUSCH signal. Furthermore, the PUSCH signal generating sections 307 control transmission power of the PUSCH signal, and control total transmission power of PUSCH signals transmitted in all component carriers to within specified transmission power. The PUSCH signal generating section 307 inputs the coded/modulated PUSCH signal to the DFT section 308.

The DFT section 308 performs discrete Fourier transform on the coded/modulated PUSCH signal, thereby transforms the time-series signal into the signal in the frequency domain, and inputs the transformed PUSCH signal to the PUSCH mapping section 309. The PUSCH mapping section 309 maps the DFT-processed PUSCH signal to radio resources of each transmission layer.

Uplink channel signals output from the PUCCH mapping sections 305 and PUSCH mapping sections 309 are input to the IFFT section 311. The IFFT section 311 performs inverse fast Fourier transform on the uplink channel signals, thereby transforms the signals in the frequency domain into the time-series signal, and inputs the signal to the CP adding section 312. In addition, the IFFT section 311 may be configurations provided independently for each component carrier. The CP adding section 312 inserts a cyclic prefix in the time-series signal of the uplink channel signal. In addition, the cyclic prefix functions as a guard interval to absorb the difference in multipath propagation delay. The uplink channel signal provided with the cyclic prefix is output to the transmission/reception section 103.

Thus, when the PUSCH signal is not transmitted in the same subframe as the UCI signal in the component carrier #1, the mobile terminal apparatus 10 multiplexes the UCI signal into the PUCCH signal to transmit to the base station apparatus 20. Meanwhile, when the PUSCH signal is transmitted in the same subframe as the UCI signal in the component carrier #1, the mobile terminal apparatus 10 multiplexes the UCI signal into the PUSCH signal to transmit to the base station apparatus 20.

Figure 8:
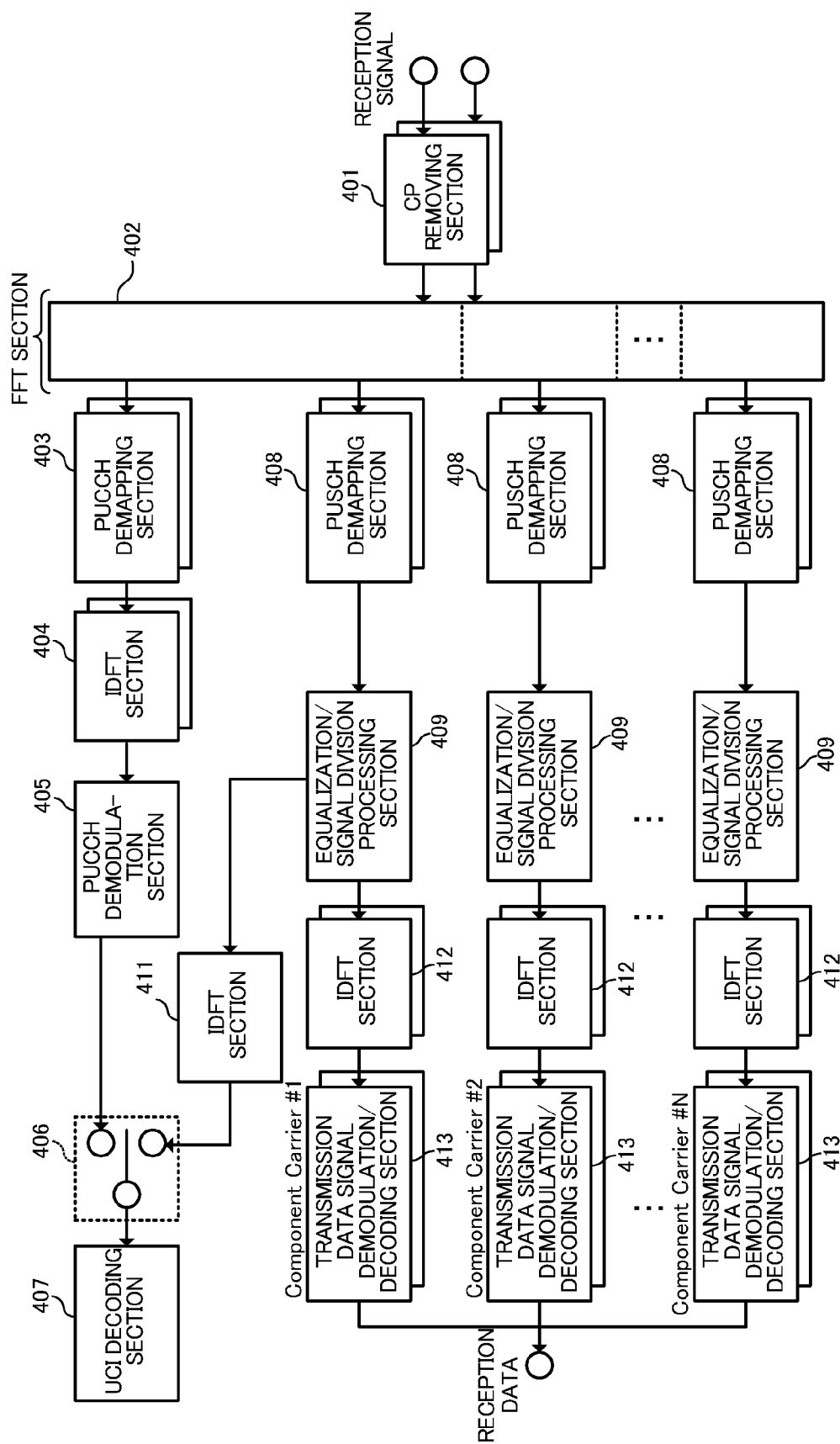
FIG. 8 is a functional block diagram of a baseband signal processing section that the base station apparatus has.

Referring to FIG. 8, described is the functional configuration of the baseband signal processing section that the base station apparatus has according to this Embodiment. FIG. 8 is a functional block diagram of the baseband signal processing section that the base station apparatus has according to this Embodiment. In addition, in FIG. 8, described is an uplink configuration for the mobile terminal apparatus to transmit transmission signals to the base station apparatus. Further, FIG. 8 exemplifies the base station configuration that supports the mobile communication system with N component carriers (CC#1 to CC#N), and describes the configuration for performing transmission using two transmission layers.

As shown in FIG. 8, the baseband signal processing section 204 is provided with CP removing sections 401, FFT section 402, PUCCH demapping sections 403, IDFT sections 404, PUCCH demodulation section 405, path switching section 406, and UCI decoding section 407. The CP removing section 401 removes a cyclic prefix from an uplink channel signal to input to the FFT section 402. The FFT section 402 performs fast Fourier transform on the CP-removed uplink channel signal, and thereby transforms the time-series signal into the signal in the frequency domain. In addition, the FFT section 402 may be configurations provided independently for each component carrier.

The PUCCH demapping section 403 retrieves the PUCCH signal mapped to radio resources for each transmission layer to input to the IDFT section 404. The IDFT section 404 performs inverse discrete Fourier transform on the PUCCH signal input from the PUCCH demapping section 403, thereby transforms the signal in the frequency domain into the time-series signal, and inputs the transformed PUCCH signal to the PUCCH demodulation section 405.

The PUCCH demodulation section 405 demodulates the PUCCH signal input from the IDFT section 404 for each of a plurality of subcarriers. At this point, when a PUSCH signal is not transmitted in the component carrier #1, the UCI signal is multiplexed into the PUCCH signal. When the UCI signal is multiplexed into the PUCCH signal, the PUCCH signal demodulation section 405 inputs the UCI signal to the path switching section 406. When the UCI signal is multiplexed into the PUCCH signal, the path switching section 406 inputs the UCI signal to the UCI decoding section 407. The UCI decoding section 407 decodes the UCI signal.

Further, the baseband signal processing section 204 is provided with PUSCH demapping sections 408, equalization/signal division processing sections 409, IDFT sections 411, 412, and transmission data signal demodulation/decoding sections 413. The PUSCH demapping sections 408 retrieve the PUSCH signals mapped to radio resources for each transmission layer to input to the equalization/signal division processing sections 409. The equalization/signal division processing section 409 removes distortion of the phase and amplitude of each subcarrier from the PUSCH signal. Further, when the UCI signal is multiplexed into the PUSCH signal, the equalization/signal division processing section 409 of the component carrier #1 divides into the transmission data signal and the UCI signal.

The IDFT section 411 performs inverse discrete Fourier transform on the UCI signal divided in the equalization/signal division processing section 409, thereby transforms the signal in the frequency domain into the time-series signal, and inputs the transformed UCI signal to the UCI decoding section 407 via the path switching section 406. The UCI decoding section 407 decodes the UCI signal.

The IDFT section 412 performs inverse discrete Fourier transform on the transmission data signal divided in the equalization/signal division processing section 409, thereby transforms the signal in the frequency domain into the time-series signal, and inputs the transformed transmission data signal to the transmission data signal demodulation/decoding section 413. The transmission data signal demodulation/decoding section 413 demodulates the transmission data for each of a plurality of subcarriers, while decoding the demodulated transmission data signal. The transmission data signal demodulation/decoding section 413 inputs the decoded transmission data signal to the propagation path interface 206.

Thus, when the PUSCH signal is not transmitted in the same subframe as the UCI signal from the mobile terminal apparatus 10, the base station apparatus 20 acquires the UCI signal via the PUCCH signal. Meanwhile, when the PUSCH signal is transmitted in the same subframe as the UCI signal from the mobile terminal apparatus 10, the base station apparatus 20 acquires the UCI signal via the PUSCH signal of the component carrier #1.

The method of transmitting the UCI signal will be described with reference to FIGS. 9 to 11 and 13. FIG. 9 is an explanatory view of the first method of transmitting the UCI signal. FIG. 10 is an explanatory view of the second method of transmitting the UCI signal. FIG. 11 illustrates an arrangement configuration of UCI signals multiplexed into a PUSCH signal. FIG. 13 is an explanatory view of the third method of transmitting the UCI signal. In addition, in the first to third transmission methods, the method of transmitting the UCI signal when the UCI signal and the PUSCH signal are not transmitted in the subframe is described above, and is omitted (see FIG. 3B). Further, FIGS. 9, 10 and 13 exemplify one-layer transmission and two-layer transmission to describe, but the number of transmission layers is not limited, and the invention is applicable to multi-layer transmission of three layers or more.

Figure 9A:
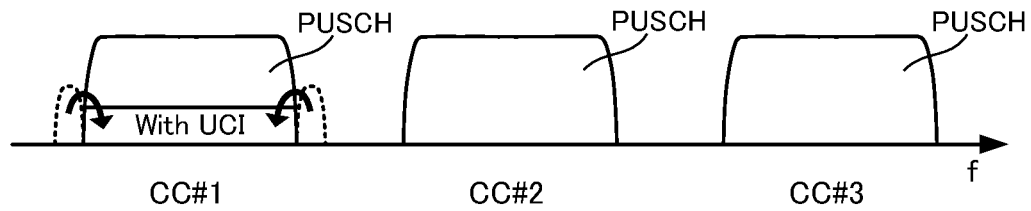
FIGS. 9A, 9B, and 9C contain explanatory views of a first method of transmitting a UCI signal.

As shown in FIG. 9A, in one-layer transmission in the first transmission method, in the case of transmitting the PUSCH signal in the same subframe as the UCI signal, the mobile terminal apparatus 10 multiplexes the UCI signal into the PUSCH signal of the user specific component carrier to transmit to the base station apparatus 20. For example, in the case of transmitting the PUSCH signal in component carriers #1 to #3, the mobile terminal apparatus 10 multiplexes the UCI signal into the PUSCH signal of the user specific component carrier #1 assigned the PUCCH signal.

As shown in FIG. 11, the UCI signal multiplexed into the PUSCH signal is multiplexed into the same symbol as the transmission data signal. For example, when the CQI, PMI, RI, ACK or NACK is transmitted as the UCI signal, the CQI and PMI are arranged in on the low band side of the transmission data signal, and the RI, ACK and NACK are arranged on the high band side of the transmission data signal. In addition, the arrangement configuration of the UCI signals of FIG. 11 is only an example, and the invention is not limited to this configuration. It is possible to adopt any arrangement configurations in which the UCI signal is arranged inside the PUSCH.

Figure 9B:
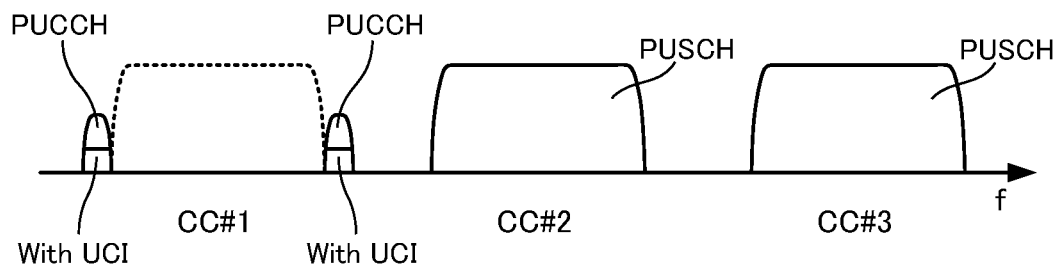

As shown in FIG. 9B, when the PUSCH signal is transmitted in the same subframe as the UCI signal in a component carrier except the user specific component carrier, the mobile terminal apparatus 10 multiplexes the UCI signal into the PUCCH signal to transmit to the base station apparatus 20. For example, in the case of transmitting the PUSCH signal in component carriers #2 and #3, the mobile terminal apparatus 10 multiplexes the UCI signal into the PUCCH signal transmitted in the user specific component carrier #1.

Figure 9C:
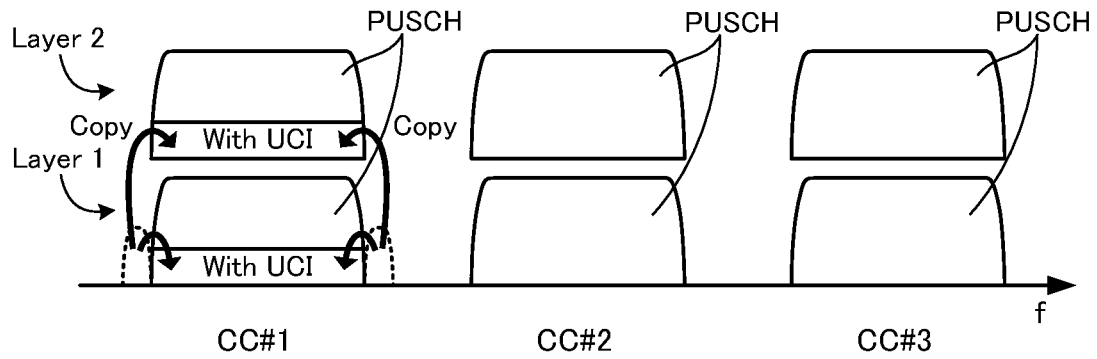

As shown in FIG. 9C, in multilayer transmission in the first transmission method, in the case of transmitting the PUSCH signal in the same subframe as the UCI signal, the mobile terminal apparatus 10 multiplexes the UCI signal into PUSCH signals in all transmission layers of the user specific component carrier to transmit to the base station apparatus 20. For example, in the case of transmitting the PUSCH signal in two transmission layers of each of component carriers #1 to #3, the mobile terminal apparatus 10 duplicates the UCI signal to multiplex into the PUSCH signal of the first layer of the user specific component carrier #1, and multiplexes the signal into the second layer of the user specific component carrier #1.

In addition, the mobile terminal apparatus 10 may be configuration for mapping while decreasing the coding rate, instead of simply duplicating the UCI signal. In this case, the mobile terminal apparatus 10 decreases the coding rate to ½, codes the UCI signal repeatedly, and thereby multiplexes into the PUSCH signals transmitted in two layers of the component carrier CC#1.

Further, inter-transmission layer transmission diversity may be applied in in multilayer transmission. As a transmission diversity method, it is conceivable to apply a PVS (Precoding Vector Switching) method, SD-CCD (Small Delay Cyclic Delay Diversity) method, etc. By this means, transmission diversity is applied between transmission/reception antennas of each transmission layer, and it is possible to increase the quality of the reception level of the UCI signal transmitted in each transmission layer.

Figure 10A:
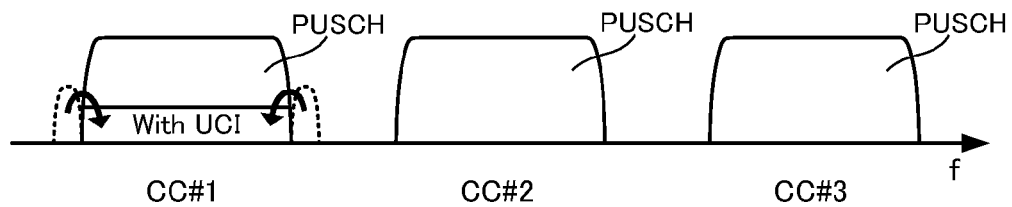
FIGS. 10A, 10B, and 10C contain explanatory views of a second method of transmitting a UCI signal.
Figure 10B:
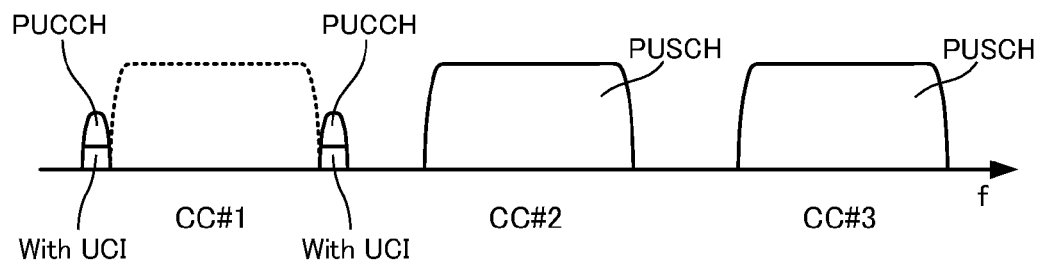
Figure 11:
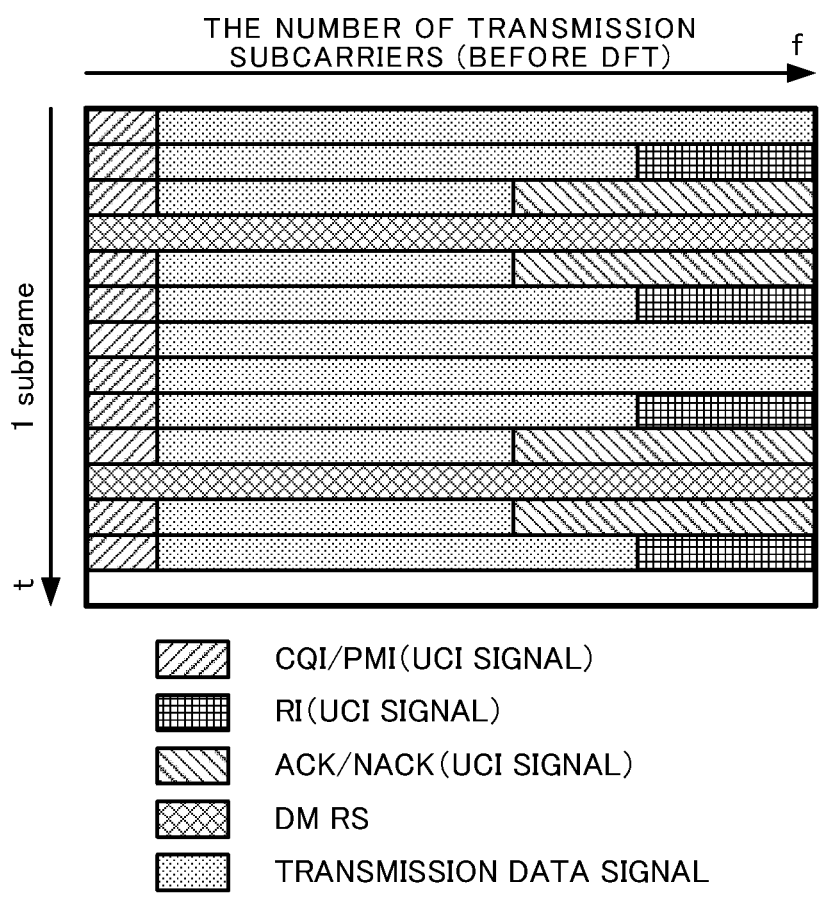
FIG. 11 illustrates an arrangement configuration al UCI signals multiplexed into a PUSCH signal.

As shown in FIGS. 10A and 10B, one-layer transmission in the second transmission method is the same as one-layer transmission in the first transmission method as described above. In other words, in the case of transmitting the PUSCH signal in the same subframe as the UCI signal, the mobile terminal apparatus 10 multiplexes the UCI signal into the PUSCH signal of the user specific component carrier to transmit to the base station apparatus 20. Meanwhile, when the PUSCH signal is transmitted in the same subframe as the UCI signal in a component carrier except the user specific component carrier, the mobile terminal apparatus 10 multiplexes the UCI signal into the PUCCH signal to transmit to the base station apparatus 20.

Figure 10C:
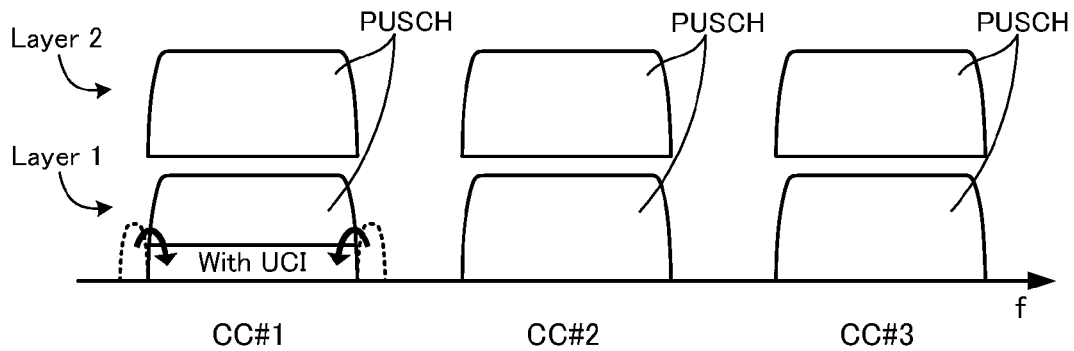

As shown in FIG. 10C, in multilayer transmission in the second transmission method, in the case of transmitting the PUSCH signal in the same subframe as the UCI signal, the mobile terminal apparatus 10 multiplexes the UCI signal into the PUSCH signal of the first layer of the user specific component carrier to transmit to the base station apparatus 20. For example, in the case of transmitting the PUSCH signal in two layers of each of component carriers #1 to #3, the mobile terminal apparatus 10 multiplexes the UCI signal into the PUSCH signal of the first layer of the user specific component carrier #1. In other words, in multilayer transmission of the second transmission method, duplication of the UCI signal is not performed between transmission layers.

In addition, in multilayer transmission of the second transmission method, it is necessary that the base station apparatus 20 performs MIMO signal division processing on the UCI signal. This is because the UCI signal is transmitted in only one transmission layer among a plurality of transmission layers and the UCI signal and transmission data signals or the like of the other transmission layers are thereby spatially multiplexed. Meanwhile, in multilayer transmission in the first transmission method, since the UCI signal is transmitted in all the transmission layers, it is possible to extract only the UCI signal, and it is not necessary to perform the MIMO signal division processing on the UCI signal. For example, the MIMO signal division processing is performed in the equalization/signal division processing sections 409 of the base station apparatus 20.

Figure 13A:
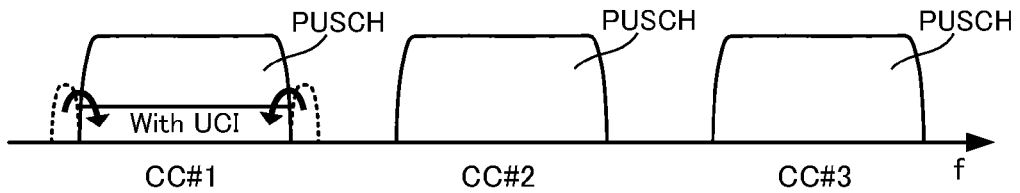
FIGS. 13A, 13B, and 13C contain explanatory views of a third method of transmitting a UCI signal.
Figure 13B:
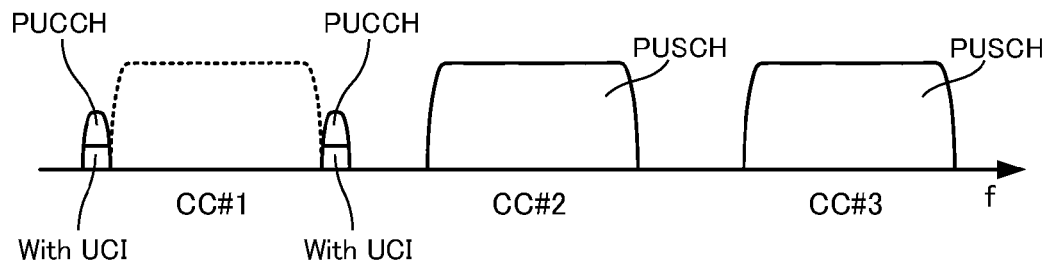

As shown in FIGS. 13A and 13B, one-layer transmission in the third transmission method is the same as one-layer transmission in the first transmission method as described above. In other words, in the case of transmitting the PUSCH signal in the same subframe as the UCI signal, the mobile terminal apparatus 10 multiplexes the UCI signal into the PUSCH signal of the user specific component carrier to transmit to the base station apparatus 20. Meanwhile, when the PUSCH signal is transmitted in the same subframe as the UCI signal in a component carrier except the user specific component carrier, the mobile terminal apparatus 10 multiplexes the UCI signal into the PUCCH signal to transmit to the base station apparatus 20.

Figure 13C:
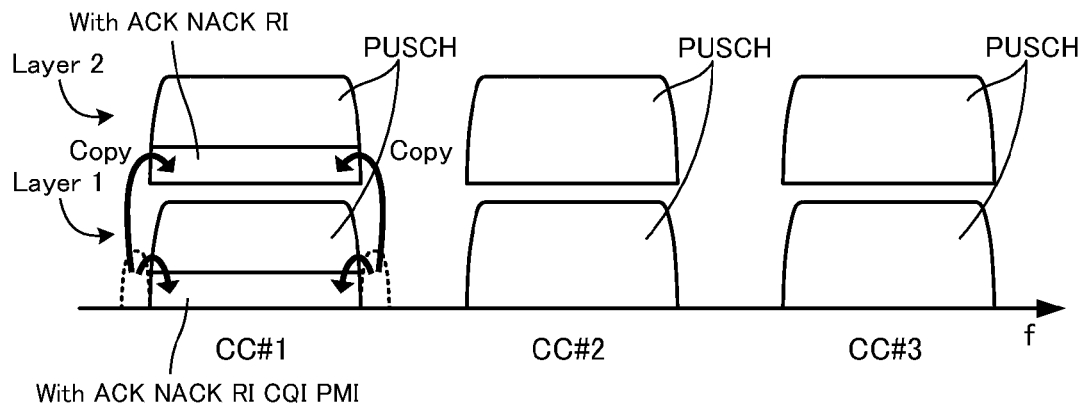

As shown in FIG. 13C, in multilayer transmission in the third transmission method, the above-mentioned first transmission method and second transmission method are used properly corresponding to predetermined conditions. For example, in multilayer transmission in the third transmission method, when the PUSCH signal is transmitted in the same subframe as the UCI signal, corresponding to the signal type of the UCI signal, the mobile terminal apparatus 10 multiplexes the UCI signal into the PUSCH signal of the first layer, or PUSCH signals of all transmission layers of the user specific component carrier to transmit to the base station apparatus 20.

For example, in the case of transmitting the PUSCH signal in two transmission layers of each of component carriers #1 to #3, the mobile terminal apparatus 10 multiplexes the UCI signal such as ACK, NACK and RI requiring high quality to PUSCH signals of all layers of the user specific component carrier #1. Meanwhile, the mobile terminal apparatus 10 multiplexes the remaining UCI signal such as CQI and PMI into the PUSCH signal of the first layer of the user specific component carrier #1.

In this case, the mobile terminal apparatus 10 duplicates ACK, NACK or RI from the UCI signal of the first layer of the user specific component carrier #1 to multiplex into the PUSCH signal of the second layer of the component carrier #1. In other words, in this transmission method, duplication of the CQI and PMI is not performed between transmission layers. In this way, it is possible to improve reliability of the UCI signal requiring high quality by using the first transmission method, while decreasing overhead by using the second transmission method in the other UCI signals.

In addition, described herein is the configuration for using the first transmission method in ACK, NACK and RI, while using the second transmission method in the CQI and PMI, but the invention is not limited to this configuration. It is essential only that the third transmission method is to switch the transmission layer to multiplex the UCI signal in the user specific component carrier corresponding to the signal type of the UCI signal. For example, the CQI and PMI may be multiplexed into all PUSCH signals of the user specific component carrier #1, and ACK, NACK and RI may be multiplexed into the PUSCH signal of the first layer of the user specific component carrier #1.

Further, in the third transmission method, as well as the signal type of the UCI signal, it is also possible to use the first transmission method and the second transmission method properly corresponding to predetermined conditions such as apparatus performance, time zone and a change in the communication environment. Furthermore, in the third transmission method, it is also possible to use the first transmission method and the second transmission method properly by a change in setting by the user or instructions from the base station apparatus 20.

Figure 14:
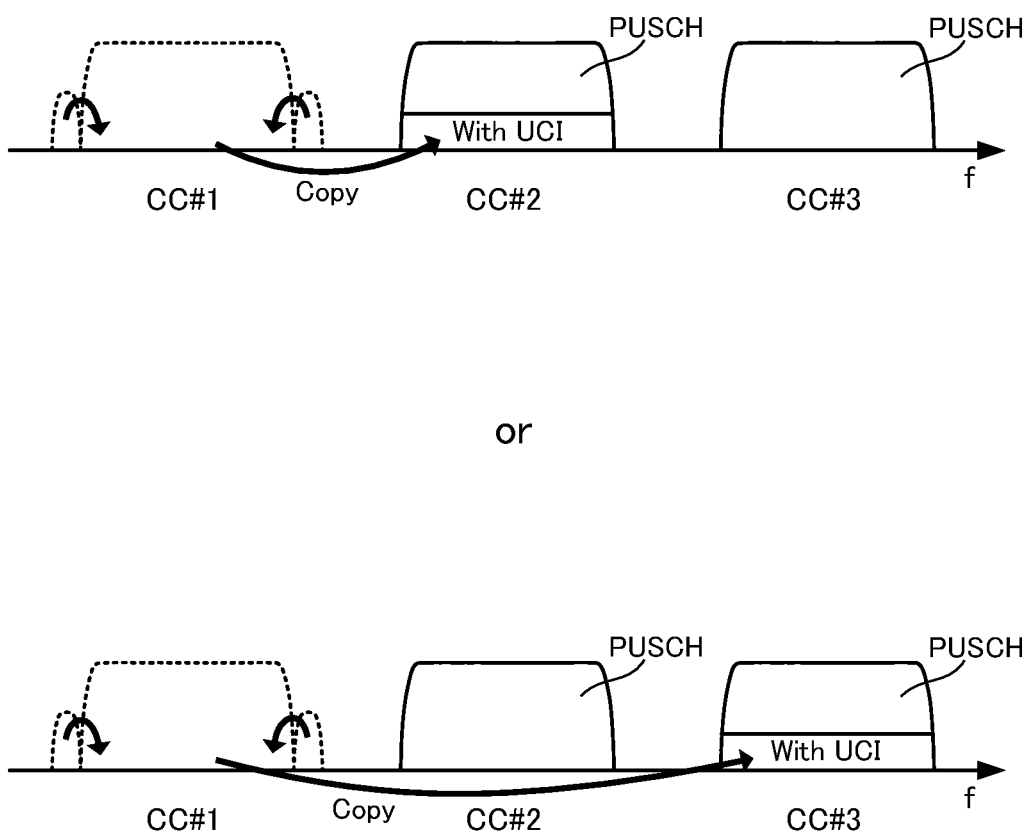
FIG. 14 is an explanatory view of a method of transmitting a UCI signal in any of component carriers except a user specific component carrier.

The above-mentioned first, second and third transmission methods adopt the configuration in which the mobile terminal apparatus 10 multiplexes the UCI signal into the PUCCH signal to transmit to the base station apparatus 20 when the PUSCH signal is transmitted in the same subframe as the UCI signal in a component carrier except the user specific component carrier, but are not limited to this configuration. As shown in FIG. 14, such a configuration may be adopted that the mobile terminal apparatus 10 multiplexes the UCI signal into the PUSCH signal in any of component carriers except the user specific component carrier to transmit to the base station apparatus 20.

For example, the mobile terminal apparatus 10 duplicates the UCI signal generated for the PUSCH signal of the user specific component carrier #1 to multiplex into the PUSCH signal of the component carrier #2 or the component carrier #3. In this case, the mobile terminal apparatus 10 may preferentially select a carrier large in the payload size, carrier large in the assigned resource block size, carrier good in SINR, carrier of low frequencies with few propagation path errors and the like, or may set priorities of component carriers beforehand. Alternatively, the carrier may be notified by RRC signaling or the like.

Figure 15:
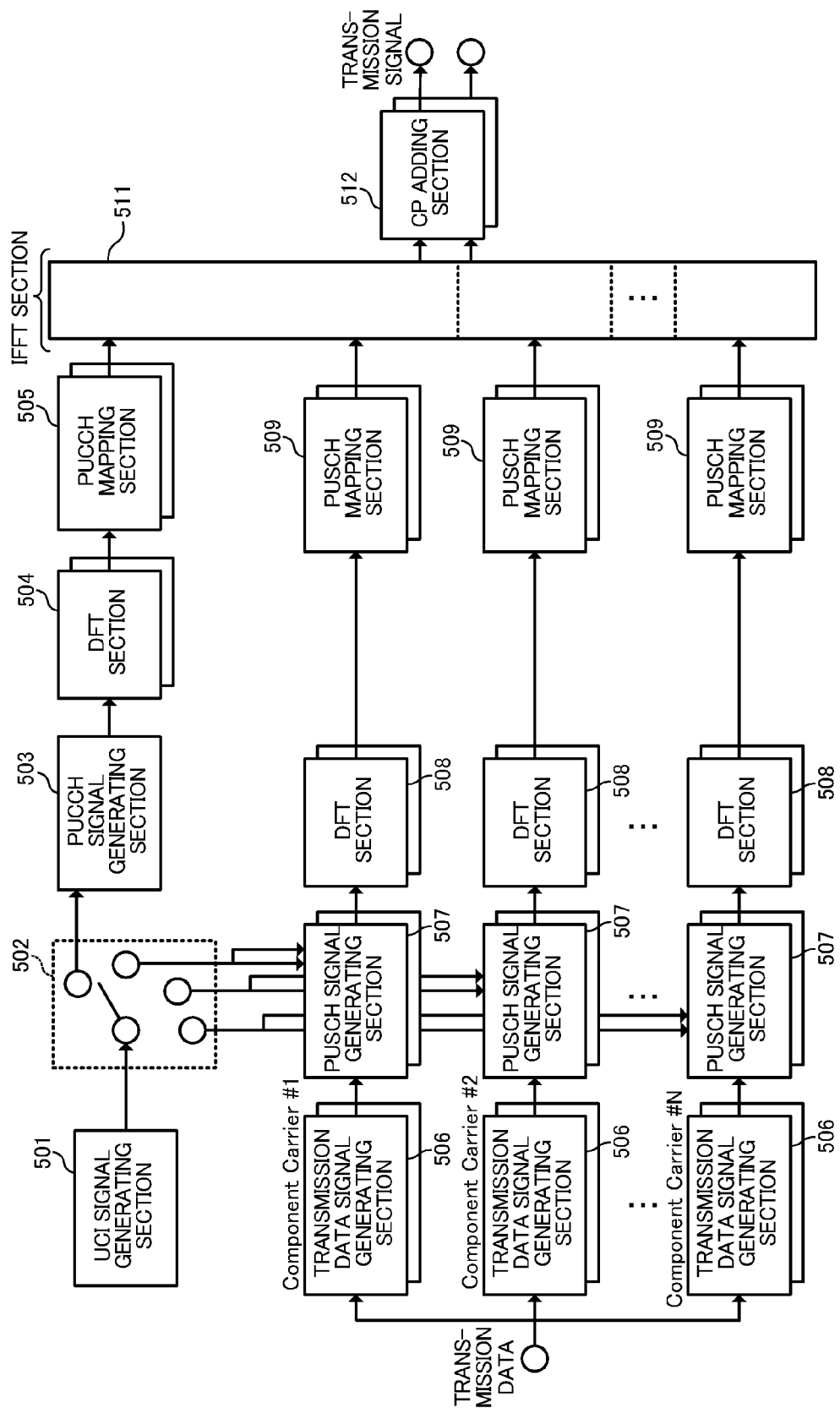
FIG. 15 is another functional block diagram of the baseband signal processing section that the mobile terminal apparatus has.

When the mobile terminal apparatus 10 multiplexes the UCI signal into the PUSCH signal in any of component carriers except the user specific component carrier, the functional blocks of the baseband signal processing section 104 of the mobile terminal apparatus 10 are as shown in FIG. 15. FIG. 15 is another functional block diagram of the baseband signal processing section that the mobile terminal apparatus has according to this Embodiment. In addition, FIG. 15 is the same as FIG. 7 except the configuration of the path switching section. Accordingly, the description is omitted in same configuration as in FIG. 7, and the difference is only described.

A path switching section 502 switches a signal path of the UCI signal corresponding to the presence or absence of the PUSCH signal in each component carrier. When the UCI signal and the PUSCH signal are not transmitted in the same subframe, the path switching section 502 switches an input destination of the UCI signal to a PUCCH signal generating section 503. Meanwhile, when the PUSCH signal is transmitted in the same subframe as the UCI signal in the user specific component carrier #1, the path switching section 502 switches an input destination of the UCI signal to a PUSCH signal generating section 507 of the component carrier #1.

Further, when the PUSCH signal is not transmitted in the same subframe as the UCI signal in the component carrier #1, and is transmitted in the same subframe as the UCI signal in another component carrier, the path switching section 502 switches a transmission destination of the UCI signal to a PUSCH signal generating section 507 of any of component carriers except the component carrier #1. At this point, the path switching section 502 switches the input destination of the UCI signal in the component carrier except the component carrier #1, corresponding to the payload size, the assigned resource block size, SINR, priority or the like.

Figure 16:
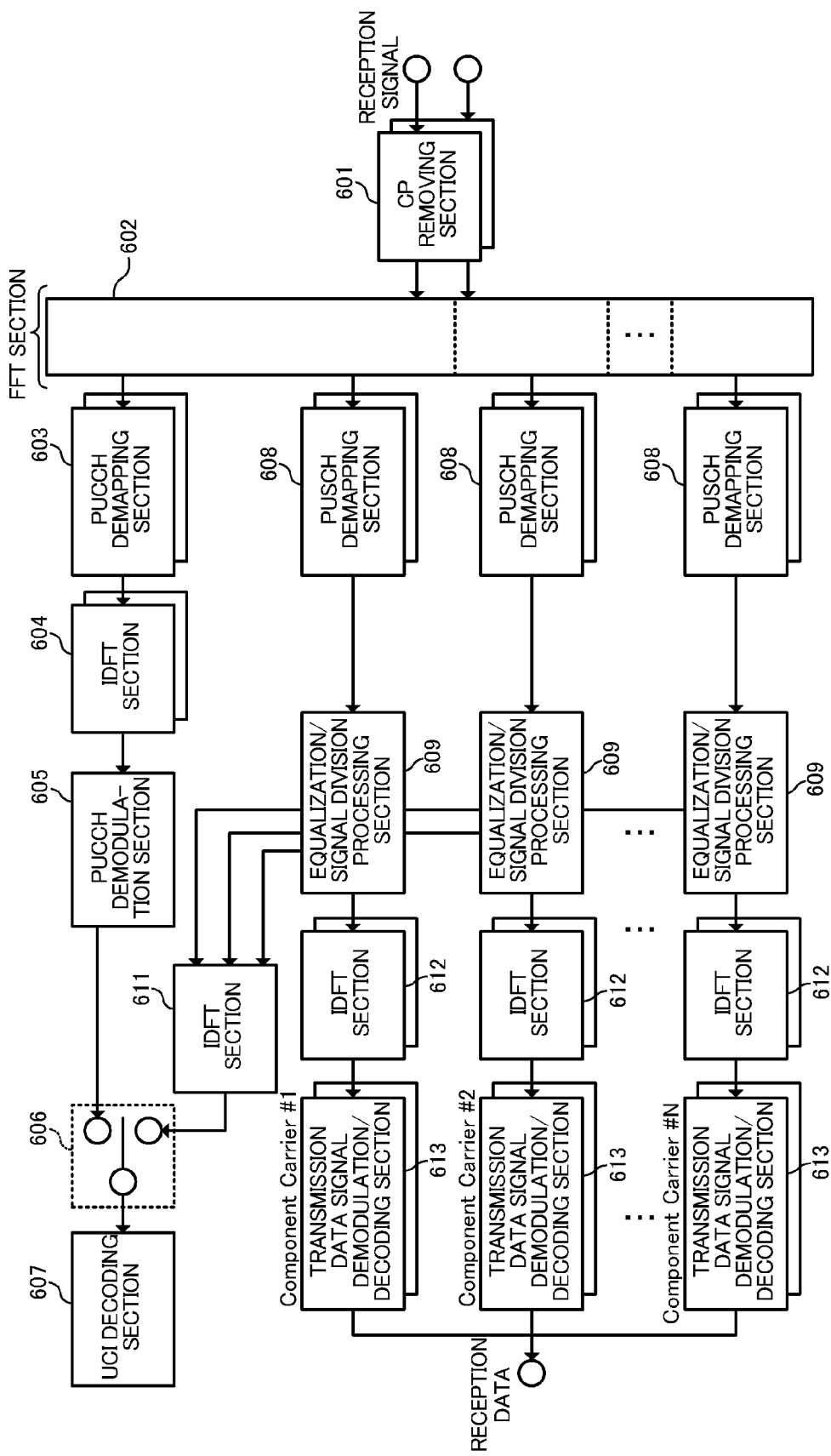
FIG. 16 is another functional block diagram of the baseband signal processing section that the base station apparatus has.

Moreover, when the mobile terminal apparatus 10 multiplexes the UCI signal into the PUSCH signal in any of component carriers except the user specific component carrier, the functional blocks of the baseband signal processing section 204 of the base station apparatus 20 are as shown in FIG. 16. FIG. 16 is another functional block diagram of the baseband signal processing section that the base station apparatus has according to this Embodiment. In addition, FIG. 16 differs from FIG. 8 in the configuration for acquiring the UCI signal from not only the user specific component carrier but also another component carrier. Accordingly, the description is omitted in the same configuration as in FIG. 8, and the difference is only described.

As described above, when the UCI signal and the PUSCH signal are not transmitted in the same subframe, the UCI signal is multiplexed into the PUCCH signal. The UCI signal multiplexed into the PUCCH signal is extracted in a PUCCH demodulation section 605, and is input to a UCI decoding section 607 via a path switching section 606.

Meanwhile, when the PUSCH signal is transmitted in the same subframe as the UCI signal in the user specific component carrier #1, the UCI signal is multiplexed into the PUSCH signal of the component carrier #1. The UCI signal is divided from the transmission data in an equalization/signal division processing section 609 of the component carrier #1, and is input to the UCI signal decoding section 607 via an IDFT section 611 and the path switching section 606.

Further, when the PUSCH signal is not transmitted in the same subframe as the UCI signal in the component carrier #1, and is transmitted in the same subframe as the UCI signal in another component carrier, the UCI signal is multiplexed into the PUSCH signal of any of the other component carriers. The UCI signal is divided from the transmission data in an equalization/signal division processing section 609 of any of the other component carriers, and is input to the UCI signal decoding section 607 via the IDFT section 611 and the path switching section 606.

In the above-mentioned first, second and third transmission methods of the UCI signal, total transmission power of PUSCH signals transmitted in respective component carriers is controlled to be within specified transmission power beforehand set on each mobile terminal apparatus. The transmission power control processing on each component carrier will be described below with reference to FIG. 12. FIG. 12 contains explanatory views of the transmission power control processing on each component carrier. In addition, FIG. 12 describes an example in which the transmission power control processing is applied to one-layer transmission, but the transmission power control processing is applicable to multilayer transmission.

Figure 12A:
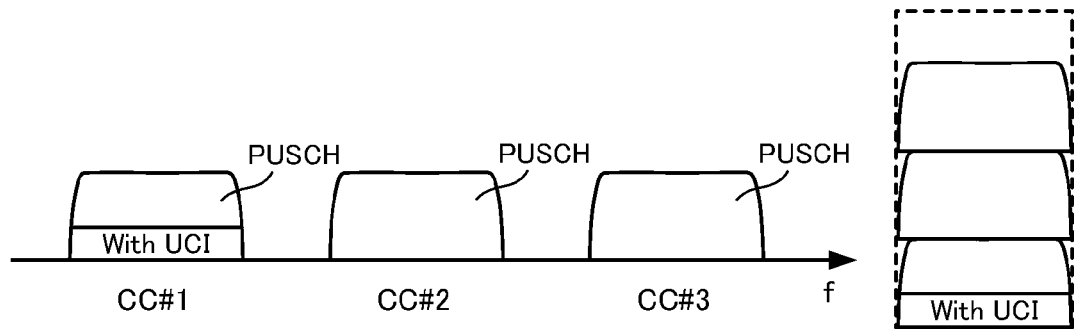
FIGS. 12A, 12B, and 12C contain explanatory views of transmission power control processing on each component carrier.

As shown in FIG. 12A, when the specified transmission power (area) shown by dashed lines has an allowance with respect to the total transmission power (area) of respective component carriers, all component carriers are transmitted with desired transmission power.

Figure 12B:
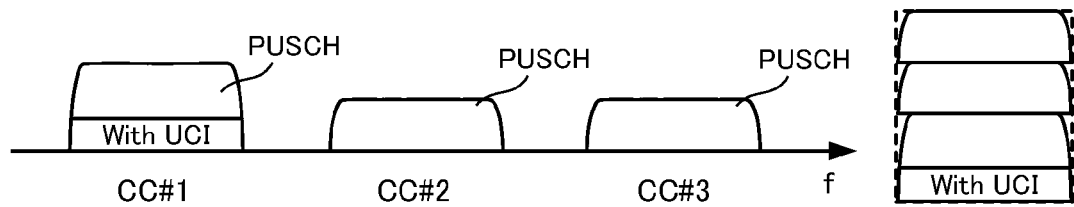

As shown in FIG. 12B, when the specified transmission power is lower than the total transmission power of respective component carriers and the total transmission power exceeds the specified transmission power, the total transmission power is controlled to be within the specified transmission power. In this case, transmission power is reduced from component carriers except the user specific component carrier. In other words, transmission power is preferentially allocated to the user specific component carrier in which the UCI signal is transmitted.

Figure 12C:

As shown in FIG. 12C, when the specified transmission power is severer with respect to the total transmission power of respective component carriers, transmission power is only allocated to the user specific component carrier. In this case, transmission power of component carriers except the user specific component carrier is set at minimum values, and transmission power of the user specific component carrier is reduced. In other words, when the total transmission power exceeds the specified transmission power even by setting transmission power of the other component carriers at minimum values, transmission power of the user specific component carrier is reduced. In addition, herein, the minimum values of transmission power of the other component carriers are set at "0", but the value may be "0" or more as long as the value is the minimum value.

Thus, in the first and second transmission methods of the UCI signal, since the UCI signal is transmitted in only the user specific component carrier, transmission power of the user specific component carrier is preferentially maintained. By this means, it is possible to ensure transmission of the UCI signal within the specified transmission power, while supporting increases in the system band and increases in the transmission layer. In addition, such a configuration is adopted that the transmission power control processing is performed in the PUSCH signal generating sections 307 provided for each component carrier, but the invention is not limited to the configuration. A control section may be newly provided that totally controls transmission power of a plurality of component carriers.

As described above, according to the mobile terminal apparatus 10 according to this Embodiment, in the mobile communication system of the system band comprised of a plurality of component carriers, the UCI signal is multiplexed into the PUSCH signal transmitted in the same subframe in the user specific component carrier used in transmission of the PUCCH. Accordingly, in LTE-A for aggregating a plurality of component carriers to broaden the band, it is possible to suppress and minimize changes from the method of transmitting the UCI signal of the LTE system.

In addition, the above-mentioned Embodiment adopts the configuration that the UCI signal is multiplexed into the PUSCH signal of the first layer in multilayer transmission of the second transmission method, but the invention is not limited to this configuration. Such a configuration may be adopted that the UCI signal is multiplexed into the PUSCH signal of a second or subsequent layer. Further, also in multilayer transmission of the third transmission method, in the case of using the second transmission method, such a configuration may be adopted that the UCI signal is multiplexed into the PUSCH signal of a second or subsequent layer.

Further, in the above-mentioned Embodiment, the path switching section of the mobile terminal apparatus switches the input destination of the UCI signal, based on the presence or absence of the PUSCH signal transmitted in the user specific component carrier in the same subframe as the UCI signal. In this case, it is essential only that the path switching section is of a configuration that the presence or absence of the PUSCH signal is notified from any part of the mobile terminal apparatus, and the path switching section may be a configuration of being notified from the PUSCH signal generating section of the user specific component carrier.

Furthermore, in the above-mentioned Embodiment, the mobile terminal apparatus is of the configuration for setting transmission power of the other component carriers at "0" and then reducing transmission power of the user specific component carrier, but is not limited to the configuration. The mobile terminal apparatus may be of any configuration, as long as the configuration is to maintain transmission power of the user specific component carrier at a higher level than transmission power of the other component carriers, while controlling the total transmission power to within the specified transmission power.

Still furthermore, in the above-mentioned Embodiment, the mobile terminal apparatus is of the configuration for multiplexing the UCI signal into only the PUSCH signal in the case of transmitting the PUSCH signal in the same subframe as the UCI signal, but may be of a configuration for multiplexing the UCI signal to both the PUSCH signal and the PUCCH signal.

Moreover, in the above-mentioned Embodiment, as an example of the third transmission method, the path switching section of the mobile terminal apparatus switches corresponding to the signal type of the UCI signal. In this case, it is essential only that the path switching section is of the configuration of being notified of the signal type of the UCI signal from any part of the mobile terminal apparatus, and for example, the path switching section may be a configuration of being notified from the UCI signal generating section. Further, also when the path of the path switching section is switched according to conditions of a change in the communication environment or the like, any part of the mobile terminal apparatus notifies the path switching section of various conditions.

Further, in the above-mentioned Embodiment, in the case of multiplexing the UCI signal into the PUSCH signal in any of component carriers except the user specific component carrier, the path switching section is switched according to the priorities corresponding to the resource block size, SINR, carrier frequency and the like. In this case, it is essential only that the path switching section is of a configuration of being notified of the priorities from any part of the mobile terminal apparatus.

The present invention is not limited to the above-mentioned Embodiment, and is capable of being carried into practice with various modifications thereof. For example, without departing from the scope of the invention, assignment of component carriers, the number of processing sections, processing procedures, the number of component carriers, and the number of aggregated component carriers are capable of being carried into practice with modifications thereof as appropriate. Further, the invention is capable of being carried into practice with modifications thereof as appropriate without departing from the scope of the invention.

The present application is based on Japanese Patent Application No. 2010-030374 filed on Feb. 15, 2010 and Japanese Patent Application No. 2010-181684 filed on Aug. 16, 2010, entire contents of which are expressly incorporated by reference herein.

The invention claimed is:

1. A mobile terminal apparatus that performs radio communication with a base station apparatus via one or more component carriers in a mobile communication system having a system band configurable of a plurality of component carriers, the mobile terminal apparatus comprising:
   a multiplexing section configured to, when a plurality of component carriers are configured for uplink, multiplex an uplink control information signal to any of the component carriers;
   a transmission power control section configured to control total transmission power of the component carriers to be within specified transmission power,
   a transmission section configured to transmit an uplink signal to the base station apparatus via the component carriers configured for the uplink,
   wherein, when the total transmission power exceeds the specified transmission power, the transmission power control section maintains desired transmission power of the component carrier to which the uplink control information signal is multiplexed and reduces transmission power of one or more other component carriers uniformly from desired transmission power so as to control the total transmission power not to exceed the specified transmission power, and
   when the transmission power of the one or more other component carriers is set to 0 and the total transmission power still exceeds the specified transmission power, the transmission power control section reduces transmission power of the component carrier to which the uplink control information signal is multiplexed.

2. A mobile communication system comprising a base station apparatus and a mobile terminal apparatus that performs radio communication with the base station apparatus via one or more component carriers, the mobile communication system having a system band configurable of a plurality of component carriers,
   the mobile terminal apparatus having:
   a multiplexing section configured to, when a plurality of component carriers are configured for uplink, multiplex an uplink control information signal to any of the component carriers;
   a transmission power control section configured to control total transmission power of the component carriers to be within specified transmission power,
   a transmission section configured to transmit an uplink signal to the base station apparatus via the component carriers configured for the uplink,
   wherein, when the total transmission power exceeds the specified transmission power, the transmission power control section maintains desired transmission power of the component carrier to which the uplink control information signal is multiplexed and reduces transmission power of one or more other component carriers uniformly from desired transmission power so as to control the total transmission power not to exceed the specified transmission power, and when the transmission power of the one or more other component carriers is set to 0 and the total transmission power still exceeds the specified transmission power, the transmission power control section reduces transmission power of the component carrier to which the uplink control information signal is multiplexed.

3. A transmission method in a mobile terminal apparatus that performs radio communication with a base station apparatus via one or more component carriers, the transmission method comprising the steps of:

when a plurality of component carriers are configured for uplink, multiplexing an uplink control information signal to any of the component carriers;

controlling total transmission power of the component carriers to be within specified transmission power, transmitting an uplink signal to the base station apparatus via the component carriers configured for the uplink, wherein, when the total transmission power exceeds the specified transmission power, desired transmission power is maintained for the component carrier to which the uplink control information signal is multiplexed, and transmission power of one or more other component carriers is reduced uniformly from desired transmission power so as to control the total transmission power not to exceed the specified transmission power, and when the transmission power of the one or more other component carriers is set to 0 and the total transmission power still exceeds the specified transmission power, transmission power of the component carrier to which the uplink control information signal is multiplexed is reduced.

* * * * *